Oct. 18, 1927.
K. L. HERRMANN
1,645,596
HOBBING MACHINE
Filed March 2, 1923      2 Sheets-Sheet 1
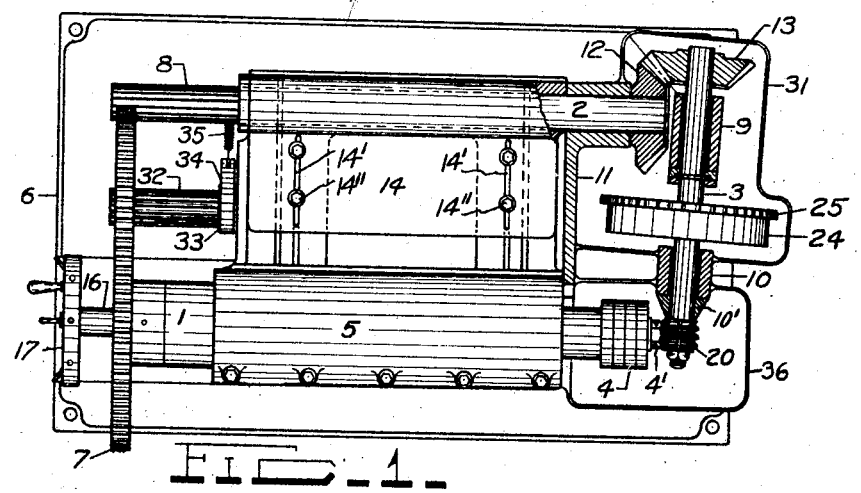
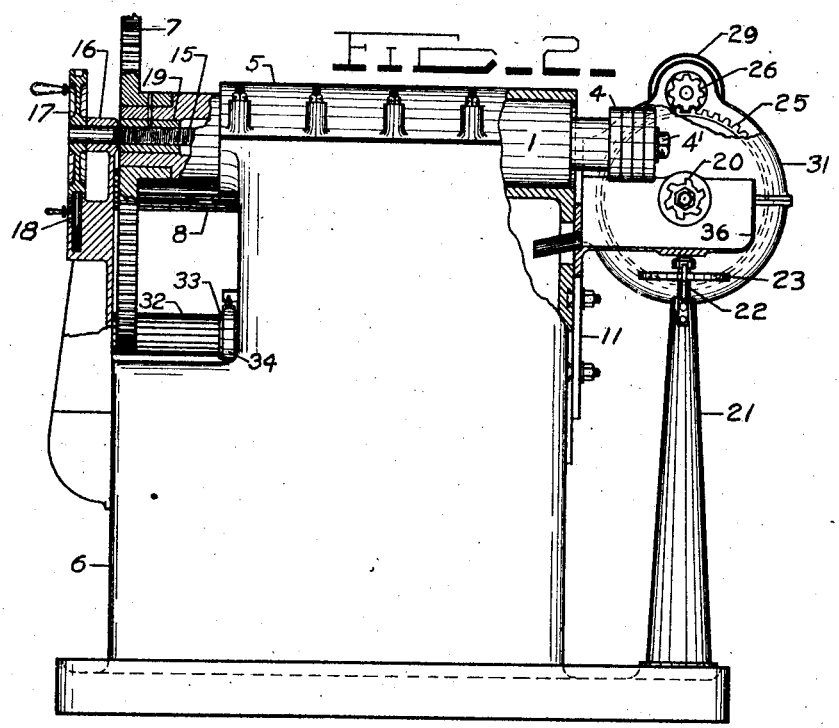
INVENTOR
Karl L. Herrmann.

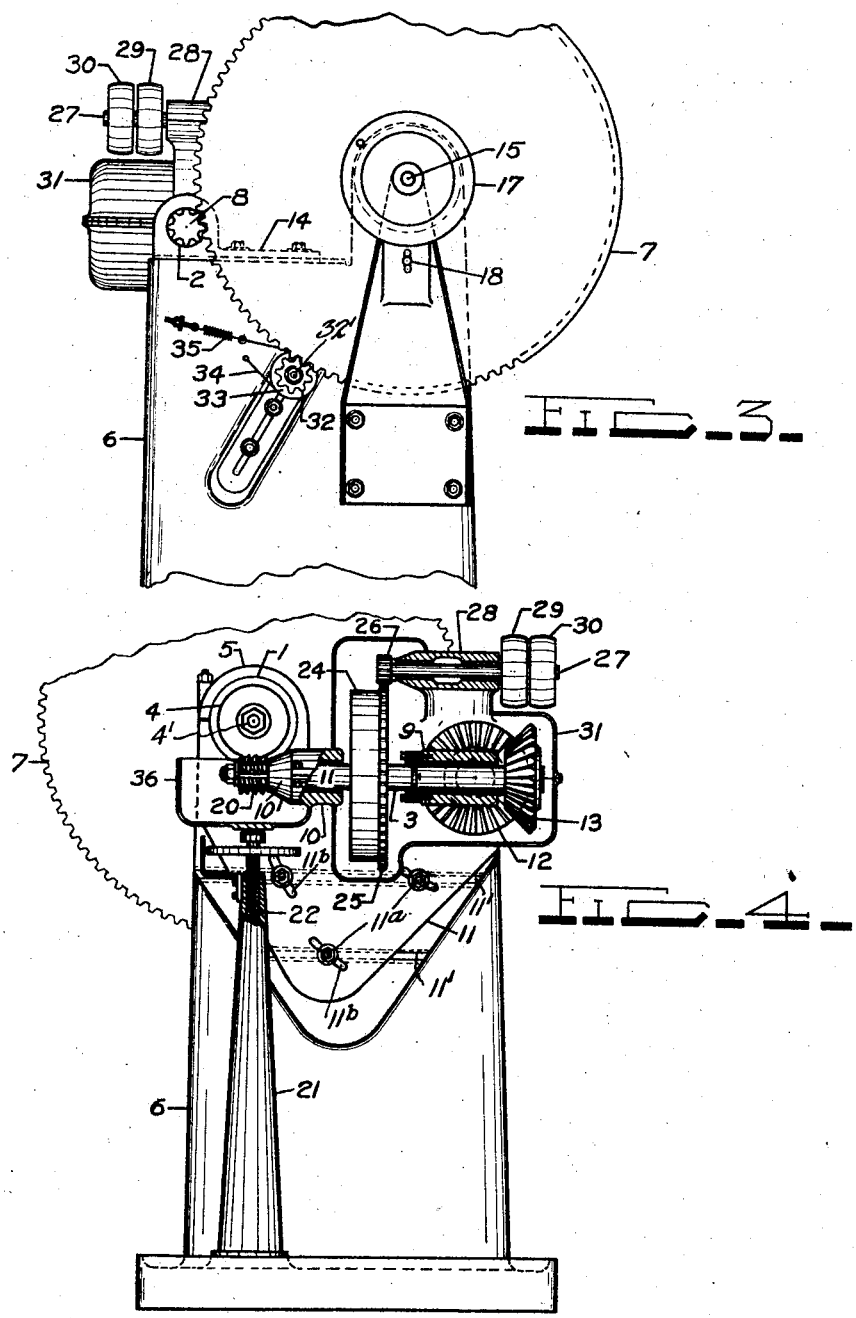

Patented Oct. 18, 1927.

1,645,596

UNITED STATES PATENT OFFICE.

KARL L. HERRMANN, OF DETROIT, MICHIGAN, ASSIGNOR TO THE STUDEBAKER CORPORATION, A CORPORATION OF NEW JERSEY.

HOBBING MACHINE.

Application filed March 2, 1923. Serial No. 622,297.

This invention relates to gear cutting machines and more particularly to that class of machines whereby the gear teeth are formed by the hobbing method.

One object of my invention is to provide a machine constructed of few parts and in which practically all back lash of the operating parts is eliminated.

Another object is to provide a machine having only two essential pairs of driving gears for operating the hob and work spindles or shafts.

A further object is to provide means whereby the work spindle or shaft can be returned to its original position after the work has moved across the hob, without rotating the hob or transmission shafts.

A still further object is to provide a brake operating on the work shaft whereby chattering and lost motion by the cutters and the work is reduced to a minimum.

Further objects and objects relating to details of construction and manufacture will definitely appear from the detailed description to follow and then claimed in the appended claims.

In the cutting of gears by means of some types of gear cutting machines, it has been necessary to rotate the work or blank in timed relation to the rotation of the cutter and to move the blank and cutter relatively and in timed relation to other movements.

These relative timed movements have heretofore been secured through the employment of a relatively large and complicated system of gearing, in which the accumulative error due to back lash, wear and inaccuracies in the gear shafts and thrust collars, usually accentuated by the invariable chattering due to the intermittent load imposed on the machine by the successive cuts of the hob teeth, tends to result in a product which varies considerably in accuracy and produces a gear not suited to machines of the higher type, in which accuracy and quiet running is essential. The inaccuracies obtained in the cutting of gears heretofore have been so apparent that this method of cutting gears could not be used where gears requiring absolute accuracy were required.

My present invention consists in a gear cutting machine wherein gears can be more accurately formed and wherein the back lash and lost motion in the operating parts is reduced to a minimum, thus providing a device whereby gears can be formed with great accuracy and such gears can be used in places now requiring gears having ground teeth. I have accomplished this result by the use of only two essential pairs of gears coupled with means for eliminating the back lash in the gears driving the operating parts and by eliminating the chatter of the work as it passes over the cutting tool. With this simple construction, I have overcome the prevalent disadvantages of machines now used for the cutting of gears and have been able to produce gears of extreme accuracy besides reducing the number of wearing parts, points of adjustment, cost of manufacture of the machines, and the cost of cutting the gears.

Means commensurate with the appended claims can be employed for accomplishing the result sought, but I have found the construction illustrated in the accompanying drawings to be satisfactory, both as to manufacture and operation and have accordingly shown this construction which is illustrative only of my invention and in which:

Figure I is a plan view of a gear cutting machine, in which is shown the means for driving the hob and work spindles, certain parts being broken away and in section to more clearly show the construction.

Figure II is a side elevation of the machine, certain parts being broken away and in section.

Figure III is a fragmentary end elevation of the left hand end of the machine shown in Figure I.

Figure IV is a fragmentary end elevational view of the right hand end of the machine shown in Figure I, certain portions being broken away and in section to more clearly show the construction.

As illustrative of an embodiment of my invention, I have shown a plurality of connected shafts or spindles comprising a work carrying spindle or shaft 1, a transmission shaft 2 and a hob spindle 3, together with means for supporting, adjusting and driving the same. The work 4, such, for example, as gear blanks, is supported on the reduced end portion of the spindle 1 and is secured thereon against rotation by means of the nut 4' which holds the work between a shoulder on the shaft 1 and a washer interposed between the work and the nut. The work spindle 1, which is journaled in a long bearing 5 formed in a main frame 6, has a large gear 7 secured thereto at the end opposite the work 4. The gear 7 is adapted to mesh with and move longitudinally along a long pinion gear 8 on the end of the transmission shaft 2 and is rotated thereby. A bevel gear 12 secured to the transmission shaft 2 at the end opposite the pinion gear 8 meshes with a bevel gear 13 secured to the hob shaft 3, which is journaled in bearings 9 and 10 carried by the bracket 11, the same being pivotally supported adjacent its one end on the transmission shaft 2. Because of the driving arrangement, the shafts or spindles 1, 2 and 3 are interconnected and there is a definite ratio of rotation between the work spindle and the hob spindle and the same are rotated by driving means which will presently be described.

A fly wheel 24 is secured to the hob spindle 3 intermediate the bearings 9 and 10 and is of proper proportions to act as a counterbalance for the hob spindle 3 and thus cause an even rotation of the hob and prevent chattering of the same. Any suitable driving means may be used to rotate the hob spindle and associated shafts and I have illustrated a means which can be applied for this purpose, which consists of a gear 25 formed on the fly wheel 24 meshing with a pinion gear 26 on a shaft 27, journaled in the bearings 28 on the bracket 11. A loose pulley 29 and a pulley 30 fixed to the shaft 27 are provided on the outer end of the shaft 27 for driving the same. Power may be supplied from any suitable source, as, for example, an electric motor or a power line shaft which may be belt-connected with the pulleys 29 and 30, the belt being in position on the pulley 30 when it is desired to operate the gear cutting machine. The method just described for driving the rotating shafts of the machine is illustrative only as it is evident other means may be used, as, for example, a drive belt may be passed directly around the fly wheel 24, thus using the same as a pulley.

The transmission shaft 2 is supported by and is journaled in a bearing member 14 which has a flat, horizontal face adapted to seat on a face formed on the main frame 6 and may be adjusted in a direction substantially at right angles to the work shaft 1 for a purpose to be described. It will be seen that if the ratio of the gears 7 and 8 is changed the work shaft 1 will be driven at a correspondingly different speed from the transmission shaft 2 and to effect this change, it is necessary to provide adjustment for the shaft 2, so that the corresponding gears 7 and 8 can be adjusted to timed relation. To provide for this adjustment, I have shown slots 14' formed in the bearing member 14 and clamping bolts 14" extending through the slots for holding the bearing member and shaft 2 in the desired adjusted position. As the bracket 11 is pivotally supported by the shaft 2, no change in the ratio of the gears 12 and 13 need be provided, as the full adjustment can be accomplished by the change of the gears 7 and 8. A washer 10' is provided between the bearing 10 and the hob 20 to properly space the hob in cutting relation to the work 4. In substituting a new gear 7 of greater or smaller diameter to change the speed of the work shaft 1, the hob spindle 3 will be moved longitudinally when adjusting the bearing member 14, and a washer 10' of proper proportion can be substituted so that the hob 20 will always be positioned to act on the blanks to be cut.

While in operation, the hob spindle 3 and the transmission shaft 2 have no movement other than rotary, while the work spindle 1 has both rotary and axial movement, the same moving across the axis of the hob spindle 3 during the operation of cutting the gear teeth on the gear blank 4. As has been described, rotation of any one of the three shafts, 1, 2 or 3 causes rotation of the other shafts and axial movement given to the work spindle 1 is obtained by a screw 15 mounted in the bearing 16 and controlled in rotative movement by the hand wheel 17, which is nominally locked against rotation by the latch 18. The screw 15 is threaded into a nut 19 secured within the work spindle 1 and when the screw 15 is locked against rotation by the latch 18, the rotation of the work spindle 1 causes the nut 19 to move axially on the screw 15, thus causing the spindle 1 to move in the same direction and carry the work 4 over the hob 20, which is secured to the end of the spindle 3 in any desired manner. After the teeth have been cut in the gear blank and the work has passed over the hob, the latch 18 may be released and the hand wheel 17 used for rapidly bringing the work spindle 1 back into position for a repetition of cutting teeth in other gear blanks. It will be seen that as the work spindle 1 moves axially to carry the work over the hob the driving gear 7 moves along the gear pinion 8 in a corresponding manner and that it is constantly in mesh therewith. It will also be seen that when the latch 18 is released and the hand wheel 17 rotated to bring the work spindle back to its original position, the gear 7 will slide on the gear pinion 8 and not necessitate the rotation of the transmission shaft 2 and hob shaft 3, while the work carrying member is being returned to its original position.

The bracket 11, in which the hob spindle 3 is supported, is pivotally mounted at one end about the transmission shaft 2 and as the transmission shaft 2 is somewhat removed from the work spindle 1, this allows the hob 20 which is mounted on the outer end of the hob spindle 3 to move in an arc of a circle with the shaft 2 as a center and this movement is utilized in regulating the position of the hob 20 relative to the work 4. This adjustment is provided to allow for gear blanks of different diameter, or hobs adapted to cut teeth having different depths, and this adjustment, together with the change in the ratio of the gears 7 and 8 provides a universal adjustment, whereby various sizes and types of gears can be cut on this machine.

As the transmission shaft 2 is adjusted to and from the work spindle 1, the bracket 11 is carried thereby and to allow for movement of the bracket 11 in a horizontal direction, I provide ways 11' in the main frame 6, adapted to receive the flat ends of bolts 11$^a$, extending through the bracket 11, on which nuts are provided to clamp the bracket in the adjusted position. To allow for various sizes of blanks to be cut and as the depth of teeth to be formed on the blanks may be varied by adjusting the hob toward or from the blanks, said adjustment being accomplished by swinging the bracket 11, which carries the hob spindle about the axis of the transmission shaft 2, as previously described, I provide slots 11$^b$ in the bracket 11, through which the bolts 11$^a$ extend and which may be clamped to hold the bracket in the desired adjusted position. To assist in this adjustment, which must of necessity be very accurate, a pedestal 21 is provided, having a screw 22 and an indicating dial 23, the screw member 22 bearing against the under portion of a chip and oil pan 36 which is formed on the bracket 11 beneath the cutter 20. Thus by turning the screw shaft by means of the indicating dial or index wheel 23, the casing or frame of which the pan 36 forms a part and which carries the hob spindle, may be accurately raised or lowered and such adjustment will be indicated by the index wheel 23. Prior to making these adjustments, the nuts on the bolts 11$^a$ are loosened and after the hob 20 is brought to the desired position, the said nuts are tightened on the bolts 11$^a$ and the bracket 11 carrying the hob and hob spindle is thus securely locked in the adjusted position.

At the rear of the machine, a gear pinion 32 (see Figure III) similar to the pinion gear 8 is rotatably mounted on a spindle 32' which is adjustably mounted on the main frame 6, the gear pinion 32 being adapted to mesh with the gear 7. A drum 33 is formed on the gear pinion 32 near its journaled end and a brake or band 34 having its one end secured to the frame, extends around the drum 33 and is held under tension against the same by means of a spring 35 secured at its one end to the main frame 6 and at its other end to the free end of the brake band 34. The band 34 exerting pressure on the drum 33 acts as a brake on the pinion 32, which in turn, acts as a brake on the gear 7 and the work shaft 1, to which the gear 7 is secured. This braking mechanism is provided to prevent the gear 7 from running away from the gear 8 and thus trying to drive it, which condition would, if there was sufficient back lash between the gears 7 and 8 and the bevel gears 12 and 13, cause a momentary irregularity in the ratio of rotation between the work spindle 1 and the hob spindle 3, thus resulting in irregularities in the work, and causing a change in shape of the gear teeth being formed, which would result in a faulty gear and a gear not suited for work where great accuracy is required.

From the foregoing description, it is believed that the construction of the machine will be readily understood and the operation of the same is as follows:

The hob spindle 3 having a hob 20 secured at one end is driven from any suitable source and the same, through the bevel gears 12 and 13, drives the transmission shaft 2 which, through its gear pinion 8, drives the gear 7, which in turn, rotates the work spindle 1 and the work 4 carried thereby. As the work spindle 1 is rotated, the same is moved longitudinally because of the screw 15 being held against rotation in the nut 19 secured within the outer end of the shaft. As the gear 7 is large in relation to the gear pinion 8, the shaft 1 has a relatively slow rotative movement and a correspondingly slow longitudinal movement across the hob 20, this movement being so proportioned that when the work has been moved across the hob, the gear teeth on the blank will have been formed. As the shaft 1 moves longitudinally, practically all back lash is eliminated because of the brake 34 acting on the gear pinion 32 which through its gear connection with the shaft 1 prevents back movement or "dwells" in the rotation of the shaft and thus cause irregularly formed teeth on the gear blank 4.

It will thus be seen that this machine presenting, as it does, a minimum number of moving parts and provided with means for eliminating chattering of both the work and the hob, that I am able to produce gears and the like, which are absolutely accurate and unvarying and that the same can be produced at a minimum of cost and without the aid of expensive labor in handling the work.

Formal changes may be made in the specific embodiment of the invention described without departing from the spirit or substance of the broad invention, the scope of which is commensurate with the appended claims.

What I claim is:—

1. In a hobbing machine, a hob shaft, a transmission shaft extending transversely of said hob shaft, a single pair of gears connecting said shafts, a work shaft parallel to said transmission shaft having a gear thereon, said gear on said work shaft meshing with and longitudinally movable on a broad-faced gear on said transmission shaft.

2. In a hobbing machine, a hob shaft, an axially immovable transmission shaft, a work shaft, a pair of bevel gears connecting said hob shaft and said transmission shaft, a broadfaced spur gear on said transmission shaft, a spur gear on said work shaft meshing with said broad-faced spur gear, and means to move said gear on said work shaft longitudinally on said broad-faced gear.

3. In a hobbing machine, a hob shaft having a gear mounted thereon, axially immovable transmission shaft having a gear mounted at each end thereof, one of said gears meshing with said first gear to be driven in unison therewith, a work shaft parallel to said transmission shaft having a gear thereon meshing with and longitudinally movable on the other of said gears on said transmission shaft, said work shaft being movable to feed the work carried thereby across said hob shaft.

4. In a hobbing machine, the combination of a hob spindle, a work carrying spindle longitudinally movable angularly across the axis of said hob spindle, means for rotating said spindles in unison comprising an axially immovable transmission shaft, gears connecting said shaft and said hob spindle, and a single pair of gears connecting said work spindle and said shaft, and means to radially move said hob spindle transversely to the axis of said work spindle.

5. In a hobbing machine, the combination of a hob shaft, an axially immovable transmission shaft, a work shaft, a single pair of gears between said hob shaft and said transmission shaft, a single pair of gears between said transmission shaft and said work shaft, a gear meshing with said gear on said work shaft, and a brake mounted thereon to retard the movement of said work shaft.

6. A hobbing machine comprising a main frame, a work spindle having gear blanks mounted thereon, a hob spindle having a hob mounted thereon, a shaft connected to said work spindle by one pair of gears and connected to said hob spindle by another pair of gears; said hob spindle mounted in a bracket pivoted about said shaft, allowing said hob to be adjusted towards said work in a circumferential path; said shaft journaled in a member secured to said main frame and adjustable to and from said work shaft; a flywheel secured to said hob spindle; means for causing a braking effect on said work shaft; means for causing rotation of said shafts; and means for causing longitudinal movement of said work shaft.

7. A hobbing machine having three shafts comprising a work shaft and a hob shaft, each connected to the third shaft by one pair of gears; means including a flywheel for causing said hob shaft to resist changes of angular velocity; means including a braking device for preventing backlash between said pairs of gears; means whereby said third shaft is adjustable to and from said work shaft; means for adjusting a hob receiving portion of said hob shaft to and from said work spindle in an accurate path; and means for causing axial movement of said work spindle.

8. In a hobbing machine, the combination of a hob shaft having a hob mounted thereon, a transmission shaft, a pair of gears connecting said shafts, a work shaft parallel with said transmission shaft and having a gear blank mounted thereon longitudinally movable across the axis of said hob spindle, a pair of gears connecting said work shaft and said transmission shaft, and means to vary the spaced relation of said transmission shaft and said work shaft.

9. In a hobbing machine, a hob shaft having a hob mounted thereon, a transmission shaft, a pair of gears connecting said shafts, a work shaft having a gear blank mounted thereon, a pair of gears connecting said last named shafts, means to change the speed of rotation of said work shaft in relation to said transmission shaft, and means to longitudinally move said hob shaft transversely to the axis of said work shaft.

10. In a hobbing machine, a hob shaft having a hob mounted thereon, a transmission shaft, a work shaft, gears connecting said hob shaft and said transmission shaft and a single pair of gears connecting said transmission and said work shaft, means to adjust said transmission shaft relative to said work shaft and to longitudinally adjust said hob shaft transversely to the axis of said work shaft, and means to radially adjust said hob shaft transversely to the axis of said work shaft.

11. In a hobbing machine, a hob shaft having a hob mounted thereon, a transmission shaft, a rotatable and longitudinally movable work shaft, gears connecting said hob shaft and said transmission shaft, a single pair of gears connecting said transmission shaft and said work shafts, and means to adjust said transmission shaft relative to said work shaft and to longitudinally adjust said hob shaft transversely to the axis of said work shaft.

Signed by me at Detroit, Michigan, U. S. A., this 28th day of February, 1923.

KARL L. HERRMANN.